United States Patent [19]
Imhof et al.

[11] Patent Number: 5,482,738
[45] Date of Patent: Jan. 9, 1996

[54] WET-CHEMICAL METALLIZATION PROCESS

[75] Inventors: Otwin Imhof, Nuertingen; Holger Kistrup, Esslingen, both of Germany

[73] Assignee: Deutsche Automobilgesellschaft mbH, Germany

[21] Appl. No.: 166,989

[22] Filed: Dec. 16, 1993

[30] Foreign Application Priority Data

Dec. 16, 1993 [DE] Germany ............ 42 42 443.7

[51] Int. Cl.⁶ .................................................. B05D 3/10
[52] U.S. Cl. ...................... 427/305; 427/304; 427/306; 427/345; 427/443.1
[58] Field of Search .................. 427/304–306, 427/345, 443.1

[56] References Cited

U.S. PATENT DOCUMENTS 2,941,902  6/1960  Talmey et al. ............................ 427/345
4,348,429  9/1982  McIntyre et al. ........................ 427/345
4,805,553  2/1989  Krulik ...................................... 427/345

FOREIGN PATENT DOCUMENTS 4106696  9/1986  Germany.
3637130  10/1986  Germany.
3925232  7/1989  Germany.

Primary Examiner—Janyce Bell
Attorney, Agent, or Firm—Evenson, McKeown, Edwards & Lenahan

[57] ABSTRACT

A wet-chemical metallization process is used for electrically non-conductive, previously chemically activated plastic substrate sheets. After metallization, the metallizing solution is separated from the substrate sheet by the influence of gravity or centrifugal force, and the sheet is rinsed with rinsing water. The metallizing solution and the rinsing water are each collected separately and subjected to a treatment for the purpose of reuse. To this end, the metallizing solution is distilled and reused as rinsing water. The rinsing water is worked up into a reusable metallizing solution by the addition of chemical metallizing components, thereby saving costs for make-up water (i.e. distilled water) and reducing pollution of the environment by contaminated effluents.

5 Claims, No Drawings

WET-CHEMICAL METALLIZATION PROCESS

BACKGROUND AND SUMMARY OF THE INVENTION

The present invention relates to a wet-chemical metallization process for electrically non-conductive, previously chemically activated plastic substrate sheets, and more particularly, to a wet-chemical metallization process for sheets of nonwoven, needlefelt or open-pore foamed materials, in which process the chemically activated substrate sheets are brought into contact with a metallizing solution, and after the chemical metallization has been carried out, the metallizing solution is again separated from the substrate sheets by the influence of gravity or centrifugal force, and in which the metallized substrate sheets are then rinsed with rinsing water and the adhering residues of metallizing solution are removed.

Chemical metallization of plastic sheets, e.g. made of nonwoven, needlefelt or open-pore foamed materials, is nowadays carried out on a large scale. Such sheets made of textile material are, among other things, inexpensive to produce and readily variable in terms of their thickness and porosity. Application of a metal layer to the surface of the sheets achieves additional beneficial properties in these products such as, e.g., electroconductivity, magnetic and heat-conductive properties. In order to metallize the plastic surfaces, such surfaces must first be prepared for metal deposition. In many cases, the plastic surfaces are first pretreated mechanically (roughening) or chemically (etching).

As the plastic fibers made up into the sheets are electrically insulating and thus unsuitable for direct chemical metal deposition they must first be "activated", i.e. noble metal-containing catalytically active particles are deposited on the plastic surface. These particles, which must be deposited on the plastic surface so as to adhere as strongly as possible, serve to catalyze the subsequent, chemical, metal deposition proper from a metastable solution. The preferred catalyst solutions are prepared on the basis of palladium/tin. In principle, however, other noble metal-containing compounds are also usable, provided they initiate the kinetically inhibited chemical reduction of dissolved metal ions on the plastic surface by a reductant also present in the solution.

Once the plastic surface has been suitably pretreated and activated, chemical metallization is carried out after any intermediate steps still to be carried out such as hydrolysis or acceleration. The metals predominantly deposited on plastic surfaces on an industrial scale are copper and nickel. Fundamental observations on the subject of activation and chemical metallization are to be found, e.g., in "Kunststoff-Galvanisierung" [Electroplating of plastic] (Leuze Verlag, Saulgau/Württ.). Similar prior art regarding the activation and metallization of porous, non-conductive plastic substrate sheets can also be gathered from the German Patents 3,631,055, 3,837,835, 3,637,130, 3,710,895, 3,925,232 and 4,106,696.

Carrying out the conventional process has disadvantageously resulted in the spent and/or excess activating solution hydroextracted from the substrate sheets after the activation operation, and the amounts of water employed, after activation and/or metallization have been carried out, for rinsing and washing all being rejected as effluent. That is, as a rule the solution and/or water is used only once. This has resulted in high costs for fresh batches of activating solutions and metallizing solutions each time and for the rinsing and/or washing water required after the substrate sheets had been activated or metallized. The amounts of effluent are many times the pore volume of the substrate sheets treated. In addition, the environment has also been polluted indirectly by these effluents.

The hydroextraction and/or rinsing water, contaminated with palladium/tin particles, after the activation operation could not be used for making up a metallizing solution, as the solution formed autodecomposes catalytically when the reaction partners are added. In the event of employing this effluent for making up a new activating or hydrolysis solution, it was believed that the precipitated palladium/tin particles would have a flocculent effect on the newly generated palladium/tin particles to be kept in solution as a complex or colloidally.

Nor was the spent and/or excess metallizing solution obtained upon rinsing after the metallization operation deemed suitable for being reprocessed into a fresh metallizing solution. When plastic substrates are nickel-plated chemically, nickel flitters are flushed out which are found not only in the hydroextracted nickel-plating solution but also in the subsequently hydroextracted rinsing water. These rinsed-off metal flitters autocatalytically decompose a fresh metallizing solution.

There are known methods of reducing the amounts of effluent produced in the course of activation and metallization of plastic substrate sheets. The purpose of such methods is, firstly, to reduce expenditure for the water employed and, secondly, to reduce the load which the effluent produced presents to the environment. Thus, for example, German Patent 3,637,130, describes that a textile material, after it has been activated, is immediately brought into contact with a metallizing solution, without an intermediary rinsing operation. German Patent 4,033,518 discloses a process in which the effluent produced during the activation of plastic substrate sheets is reprocessed. German Patent 3,925,232 relates to a process for the chemical metallization of activated, porous plastic substrates, in which process the volume of the chemical metallizing solution is chosen to be smaller than the free pore volume of the porous substrate. German Patent 4,106,696 is based on a process for producing chemically metallized porous plastic substrate sheets, requiring as few individual steps as possible and also producing as little effluent as possible.

These known methods achieve only a small reduction in the amounts of effluent produced. In view of the costs of the make-up water employed in the manufacture of activated and metallized plastic substrate sheets and of the environmental pollution by the effluent produced, these methods cannot be regarded as satisfactory.

An object of the present invention is, therefore, to overcome the drawbacks of known methods and to provide a process which makes it possible, in the process of metallizing plastic substrate sheets, to reuse a number of times, after appropriate processing, make-up water employed in carrying out the process, for the individual process steps and thus to reduce by a greater extent the amount of effluent produced.

This object has been achieved, according to the present invention, by a method in which the separated metallizing solution and the rinsing water after use thereof are each collected separately and subjected to a treatment for reuse, the collected, used metallizing solution is set to an approximately neutral pH and is distilled, with distillate being reused as a second rinsing water, and a reusable metallizing solution is prepared from a first rinsing water by adding the chemical metallizing components.

In practice, the process is carried out such that the effluent produced in the first rinsing and washing operation, after an activated plastic substrate sheet has been metallized, is collected. This "effluent" is then used, by adding the individual components, to prepare once again a chemical metallizing solution by way of which in a similar manner further activated plastic substrate sheets are metallized. The spent and/or excess metallizing solutions hydroextracted from the substrate sheets after metallization has been carried out are in turn collected. This solution is then set, with a weak acid, to a slightly acidic pH (from 4 to 5). Advantageously, the pH is set by employing acidic, spent and/or excess activating solution which after the activation operation of the substrate sheet has been hydroextracted therefrom and which is normally slightly acidic owing to mineral acids. This again reduces the amount of effluent produced.

The collected metallizing solution set to this pH is then distilled off in a distillation operation (e.g. in a rotary evaporator) at approximately from 70° to 80° C. This distillation is carried out until the distillate is approximately neutral (pH from 6 to 8), and the distillate obtained is then again used as rinsing and/or washing water for substrate sheets after these have been metallized. In the distillation step, the pollutants present in the spent activating and metallizing solutions are left behind in the distillation appliance as a residue in the form of a sludge. During distillation, care must of course be taken to ensure that the substances settling in the sludge of the evaporation appliance, which are thermally decomposable even at low temperatures, are not decomposed.

The non-conductive, large-area plastic substrates employed in carrying out the process are preferably sheets of nonwoven, needlefelt or open-pore foamed materials consisting of polyethylene or polypropylene, and, in the initial state resulting from their manufacture, have a porosity of greater than 50%.

DETAILED DESCRIPTION OF THE INVENTION

The invention is explained in greater detail hereinafter by way of Examples.

Example 1

A sheet of polyethylene needlefelt, having a length of 10 meters and a width of 700 mm and an initial porosity of 92%, a nominal thickness of 2.5 mm and a fiber linear density of 2.7 dtex, was treated with an activating solution based on palladium/tin. After the activation operation, the spent activating solution was hydroextracted from the sheet, collected and the solution was processed, by adding palladium chloride and tin chloride, into a fresh ready-to-use activating solution (according to German Patent 4,033,518). The sheet was then treated with a metallizing solution which, per liter of solution, contained approximately 40 g of nickel chloride hydrate, 62 g of sodium hypophosphite monohydrate, 100 g of ammonium chloride and 40 g of sodium hydroxide. The volume of the metallizing solution employed roughly corresponded to the free pore volume in the sheet of needlefelt. Following the chemical nickel-plating, the spent metallizing solution was removed from the pores of the sheet by hydroextraction, except for a residual moisture content of approximately 5%, and was collected (spent metallizing solution I). The metallized sheet was then rinsed with distilled water, this washing water was in turn hydroextracted from the pores of the sheet and was likewise collected (hydroextraction water I). This rinsing process of the metallized sheet was repeated twice with distilled water, and in each case the hydroextracted water was collected separately (hydroextraction water II and III). When the process was carried out in this way, a satisfactory sheet of needlefelt was obtained which was uniformly nickel-plated even in its interior.

Example 2

A sheet of needlefelt as described in Example 1 was activated in the same manner, but with an activating solution which had been worked up from the spent activating solution from Example 1 (in accordance with German Patent 4,033,518). This activating solution spent in turn, after the activation operation, was likewise collected and was available for renewed working up. The activated sheet was then metallized, but the chemical nickel-plating solution was made up not with pure water but with the hydroextraction water I from Example 1. The individual components for the prepared metallizing solution were added as in Example 1 to the hydroextraction water introduced as the initial charge. When the solution was made up, slight generation of hydrogen as well as an insignificant deposition of nickel on the vessel wall were observed. By bringing the substrate sheet into contact with the made up nickel-plating solution very rapidly, it was nevertheless possible to achieve completely adequate and uniform deposition of nickel on the sheet of needlefelt.

After nickel-plating of the sheet had been effected, the spent nickel-plating solution was again hydroextracted and collected (as spent metallizing solution II). The sheet was then washed with the hydroextraction water II from Example 1, and the hydroextracted water was in turn collected to be employed as hydroextraction water I for making up a fresh ready-to-use metallizing solution. The sheet was then rinsed again with the hydroextraction water III from Example 1, the water was hydroextracted again and collected as hydroextraction water II. A third rinsing operation of the sheet was carried out with distilled water obtained from the distillation operation according to Example 3. This water was likewise collected after hydroextraction as hydroextraction water III.

Example 3

The collected, spent nickel-plating solutions I and II from Examples 1 and 2 were set, employing the collected, spent, acidic activating solutions from Examples 1 and 2, to a pH from 4 to 5, the palladium and the tin having been precipitated from the solutions as hydroxides and having been removed by filtration. The overall solution was then distilled in a rotary evaporator at approximately from 70° to 80° C. The distillation product obtained was neutral, pure water, while there remained as a residue a white-grayish sludge of nickel metal flitters, phosphite, ammonium chloride and sodium chloride. The distillate was employed, as described earlier, according to Example 2 as the third washing water after metallization of the sheet.

The advantages of the process according to the present invention in particular consist in considerably smaller amounts of make-up water (distilled water) being required, when activating and metallizing non-conductive plastic substrates, for preparing metallizing solutions and for rinsing the treated substrate sheets. Moreover, the pollutants from spent activating and metallizing solutions are produced in a very concentrated form during the evaporation process of the spent metallizing solution. As a reduced amount of water is required for making up the metallizing solutions and rinsing the substrates, fewer containers for make-up water (distilled water) are also required, which accordingly also means a saving in terms of space in the production building. It was found in practice that the rinsing and/or washing water worked up according to the invention can be reintroduced a number of times into the cycle of metallization and rinsing of the metallized substrate sheet, only the water losses incurred in the process having to be replaced by make-up water. As a result, make-up water costs are saved and the environment is not polluted by contaminated effluent, or again the costs of firstly purifying the contaminated effluent are saved.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A wet-chemical metallization process for electrically non-conductive, previously chemically activated plastic substrate sheets, comprising sheets of nonwoven, needlefelt or open-pore foamed materials, including the steps of bringing the chemically activated substrate sheets into contact with a metallizing solution containing water, separating the metallizing solution from the substrate sheets by the influence of one of gravity and centrifugal force, and rinsing the metallized substrate sheets with rinsing water to remove adhering residues of the metallizing solution, wherein the separated metallizing solution and a flow off from the rinsing step after use thereof are each collected separately and subjected to a treatment for reuse, the treatment of the collected, used metallizing solution consisting of setting the solution to an approximately neutral pH and distilling the neutralized solution to separate the water from the metallizing solution for use as a second rinsing water, and the treatment of said flow off from the first rinsing step consisting of adding the chemical metallizing components to prepare a reusable metallizing solution.

2. The process according to claim 1, wherein the setting of the collected metallizing solution to a neutralized solution is effected by at least one of a spent and excess remaining activating solution hydroextracted from the substrate sheets after these have been activated, in a weakly acidic to a weakly alkaline range.

3. The process according to claim 1, wherein the collected rinsing water is worked up to obtain a fresh, ready-to-use metallizing solution and is treated with one of a nickel and copper salt as the metallizing component.

4. The process according to claim 1, wherein the substrate sheets are sheets selected of material from a group consisting of nonwoven, needlefelt and open-pore foamed materials of one of polyethylene and polypropylene.

5. The process according to claim 1, wherein the substrate sheets are sheets selected of material from a group consisting of nonwoven, needlefelt and open-pore foamed materials which in the initial state have a porosity of greater than 50%.

* * * * *